United States Patent [19]
Rennick

[11] 3,889,288
[45] June 10, 1975

[54] SYMMETRICALLY ENCODED LINE SEQUENTIAL COLOR SIGNALS

[75] Inventor: John L. Rennick, Elmwood Park, Ill.

[73] Assignee: Zenith Radio Corporation, Chicago, Ill.

[22] Filed: Feb. 28, 1973

[21] Appl. No.: 336,841

[52] U.S. Cl. .................................... 358/11; 358/14
[51] Int. Cl. ............................................ H04n 9/36
[58] Field of Search ................................ 358/11, 14

[56] References Cited

OTHER PUBLICATIONS

E. L. C. White, "Some Alternatives to the NTSC Color TV System," Journal of the Television Society, Jan.-Mar. 1957, pp. 191-206.
W. Bruch, "Attempts for Color Video Recording on Tape with Simple Home Video Recorders," Radioschau, 1966, No. 12, pp. 654-655.
B. D. Loughlin, "Recent Improvements in Band--Shared Simultaneous Color Television Systems," Proceedings of IRE, Vol. 39, No. 10, pp. 1264-1273.

*Primary Examiner*—Howard W. Britton
*Assistant Examiner*—Michael A. Masinick
*Attorney, Agent, or Firm*—John J. Pederson; Nicholas A. Camasto; Cornelius J. O'Connor

[57] ABSTRACT

An encoding and decoding system for color television signals wherein three color-difference signals representative of the color of a scene and a luminance signal representative of the brightness of the scene are symmetrically encoded as three-line sequential signals with relative amplitudes such that when the three sequential signals are matrixed in equal proportions a luminance signal is formed representative of the average luminance level of the picture over the preceding three lines. The symmetrical encoding of the color-difference signals eliminates the need for line identification and phase locking between the encoder and decoder switches, thereby resulting in substantial simplification.

16 Claims, 4 Drawing Figures

SYMMETRICALLY ENCODED LINE SEQUENTIAL COLOR SIGNALS

RELATED APPLICATION

This application is closely related to and includes subject matter claimed in a copending application, Ser. No. 319,107, filed Dec. 27, 1972 in the name of Howard F. Jirka and assigned to the assignee of the present invention.

BACKGROUND OF THE INVENTION

The present invention relates to video signal systems, and more particularly to an improved video recording system and method of encoding video signals.

Recently there has been a growing emphasis on video recording and reproducing systems. For any such system to achieve wide public acceptance, it must necessarily be economical, easily operable, productive of high quality images and, of course, compatible with existing television receivers. It should also ideally utilize an inexpensive storage medium, preferably something as economical as a plastic disc. This medium is particularly suitable for the consumer market because it is low in cost, readily manufacturable and of a format with which most consumers have great familiarity.

One problem with storage media is in obtaining sufficient bandwidth for faithful reproduction of color television signals. In the NTSC system, for example, the color subcarrier for chrominance information lies near the upper extreme of the luminance band, e.g., 3.58 MHz, necessitating a bandwidth of at least 4 MHz for faithful conveyance of the standard composite signals. The difficulty is that if a restricted bandwidth is encountered, high frequency information suffers and color reproduction will either be non-existent or severely degraded.

One prior art technique for overcoming this difficulty utilizes an electronic commutator for sequentially producing, in a low frequency portion of the available frequency band, signals representing every third horizontal line of the three primary colors, red (R), blue (B) and green (G). These signals are combined with a continuous high frequency luminance signal in the high frequency portion of the band. In this manner color fidelity is substantially preserved, and any degradation because of bandwidth limitations shows up in loss of picture detail. (There is, of course, a loss of vertical resolution when going from a simultaneous color system to a line sequential system. The loss may be considered acceptable, however.)

In the decoder for this system the sequential color signals are delayed in a pair of serially connected delay lines so that at any given instant all three color signals are available, representing color information from adjacent lines in the scene. A trio of commutator switches selectively route the line sequential signals to respective inputs of a matrix, wherein the signals are combined according to their contribution to the luminance signal to obtain the low frequency portion of the luminance signal.

For example, in the NTSC system the luminance signal Y of the scene is defined in terms of the relative contributions of the primary colors.

$$Y = 0.30R + 0.11B + 0.59G$$

While the luminance signal may be reconstructed by combining R, B and G in these proportions, the disproportionate contribution of the green signal causes the luminance signal to follow the level of that signal. This effectively delays response to a vertical brightness scene change to the next green line sequential signal, thereby substantially further degrading vertical resolution in the reproduced picture.

Assume that in a 525 line double-interlaced NTSC system the lines in each field are numbered consecutively and transmitted in the order R, B, G. The sequence $R_1$, $B_2$, $G_3$, $R_4$, $B_5$, $G_6$, etc., results. It follows that $Y_1$ during the first line can be expressed as $0.30R_1$; $Y_2$ during line 2 as $0.30R_1+0.11B_2$; $Y_3$ during the third line as $0.30R_1+0.11B_2+0.59G_3$. Similarly, $Y_4$ can be expressed as $0.30R_4+0.11B_2+0.59G_3$ and $Y_5$ as $0.30R_4+0.11B_5+0.59G_3$. It will be noted that $Y_3$, $Y_4$ and $Y_5$ each include $0.59G_3$ with much smaller red and blue signal contributions and, therefore, are substantially the same. In fact, because of the large contribution of green to luminance, the luminance level appears to follow green and will tend to substantially change only every third line when new information about green is received. This affects vertical resolution since abrupt luminance transitions can occur in the original scene but not receive full system recognition until the next sampling of green occurs.

One prior art system develops, instead of Y, a signal M composed of equal contributions of the R, G and B signals $$M = 0.33R + 0.33B + 0.33G$$

for overcoming this deficiency. Unfortunately, this system does not result in proper luminance levels and produces disturbingly inaccurate reproduction in many situations. It can be shown that a system using M instead of Y results in blue and magenta having high luminance and being desaturated, and green and yellow having low luminance and being supersaturated.

Another problem in systems wherein color information is encoded in line sequential form relates to the necessity for employing line identification means for insuring that the colordifference signals receive appropriate processing in forming the reconstituted color signal.

Still further difficulties are experienced with the means for synchronizing the operation of the transcoding apparatus; that is, the apparatus for encoding the color-difference signals into line sequential form, and the decoding apparatus. It can be readily appreciated that where mechanical devices such as disc players or tape units are interposed in the transcoding apparatus chain, speed variations may have profound adverse effects on the fidelity of the reconstituted color-difference signals.

It would, therefore, be extremely beneficial to have a transcoding system for the color information which is independent of such variables. Such a system would enable broad flexibility in handling the critical color-difference signals on a line sequential basis, free from the large bandwidth requirements.

Accordingly, it is a general object of the present invention to provide a new method of encoding color television signals.

It is a more specific object of the present invention to provide an improved video recording system for color television signals.

It is a still more specific object of the present invention to provide a novel method of encoding color television signals for use in a narrow bandwidth channel for improving vertical picture resolution and color fidelity.

The method and apparatus disclosed and claimed in the above-mentioned related application of Howard F. Jirka teaches encoding color television signals of the type comprising first, second and third color-difference signals representative of the chromaticity of a scene and a luminance signal representing elemental brightness variations in the scene by cyclically combining the first, second and third color-difference signals, one at a time, with the luminance signal to form first, second and third line sequential signals, respectively, the relative amplitudes of the line sequential signals being such that when algebraically added in equal proportions only the luminance signal remains.

The method of this invention teaches symmetrical encoding of the color information of the color television signals by composing three color-difference signals with the same proportions as would be obtained from three projections of an equivalent NTSC or other chrominance signal upon three axes mutually separated by 120°. The invention further teaches decoding the color information by applying the sequential color-difference signals to delaying means to make them simultaneously available and matrixing the simultaneously available signals with equal gains and at symmetrically displaced phase angles for recovering the color-difference signals without need for line identification nor exacting phase-locking between the encoding and decoding apparatus. In the specific embodiment chosen for the purpose of illustrating the invention the luminance signal is added to each line sequential signal and recovered by adding equal portions of the line sequential signals.

BRIEF DESCRIPTION OF THE DRAWINGS

The features of the present invention which are believed to be novel are set forth with particularly in the appended claims. The invention, together with further objects and advantages thereof, may best be understood by reference to the following drawings in which:

DESCRIPTION OF THE PREFERRED EMBODIMENTS

Figure 1:
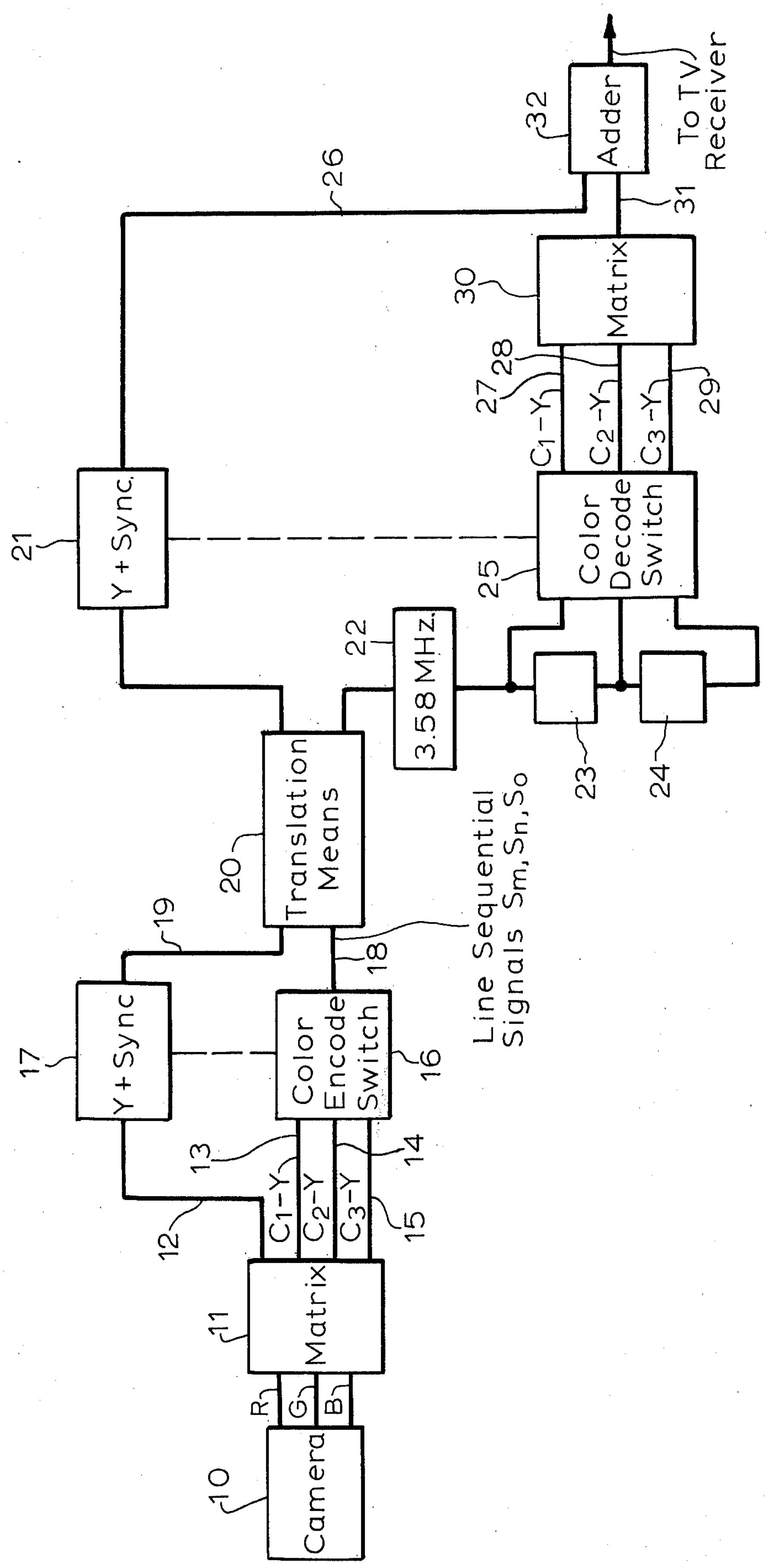
FIG. 1 is a block diagram of a color television signal transcoding system constructed in accordance with a broad aspect of the invention.

Referring to FIG. 1 of the drawings, the invention is shown in block diagram form as a transcoding system for color video signals. As such, it contains apparatus for encoding simultaneously available color-difference signals into line sequential form and for decoding the line-sequential color-difference signals and reconstituting the simultaneous color-difference signals. The link between the encoding and decoding apparatus may be a transmission line such as a telephone cable, a radio channel or a storage medium such as magnetic tape or a vinyl disc recording.

At the transmitting or studio end of the system a camera 10 produces three primary color signals R, G and B which are supplied to a matrix network 11 where, in a well-known manner, a Y (luminance) plus synchronizing information signal (sync) is produced on output lead 12, a first color-difference signal ($C_1$–Y) is produced on output lead 13, a second color-difference signal ($C_2$–Y) is produced on output lead 14, and a third color-difference signal ($C_3$–Y) is produced on output lead 15. The color-difference signals are coupled to a color encode switch 16 which, under control of the synchronizing signal from block 17, converts the simultaneously available color-difference signals into three line sequential signals $S_m$, $S_n$ and $S_o$. The dashed line joining switch 16 and block 17 indicates the sync control. The line sequential color-difference signals $S_m$, $S_n$ and $S_o$ appear on output lead 18 of color encode switch 16. The Y + sync output appearing on lead 19 from block 17, along with the encoded line sequential color-difference signals on lead 18 are coupled to translation means 20. It will be appreciated that, depending on the medium selected, translation means 20 may take any of a number of forms. For example, if a radio link is selected, translation means 20 will include the necessary carrier modulation equipment for transmitting the color-difference and Y + sync signals (and sound signals) as well as the necessary equipment for receiving and detecting these signals. Similarly, a tape recorder and playback mechanism, whether single track with multiplexed signals for the color-difference signals and Y + sync signals, or multiple track, may be employed. None of the equipment in translation means 20 constitutes any part of this invention and the selection thereof is a matter of choice.

The Y + sync output from translation means 20 is coupled to block 21 and the line sequential color-difference signals are coupled to a 3.58 MHz carrier oscillator and modulator. Here a 3.58 MHz carrier is amplitude modulated with the $S_m$, $S_n$ and $S_o$ line sequential signals and the resulting modulated signals coupled to a first input of color decode switch 25 and to a pair of series connected delay lines 23 and 24, each of which introduces a delay of one scanning line duration to the modulated line sequential color-difference signals. Thus, the line sequential signals are passed from the modulator directly to a first input of switch 25, then after being delayed one line by delay line 23, to a second input of switch 25 and, after being delayed another line by delay line 24, to a third input of switch 25. Decode switch 25 operates under control of the sync signal from block 21 (as indicated by the dashed line) and functions to change the modulated line sequential color-difference signals into simultaneously available color-difference signals. The outputs of color decode switch 25 are coupled to a matrix 30 and the modulated color-difference signals $C_1$–Y, $C_2$–Y and $C_3$–Y are simultaneously available on output leads 27, 28 and 29, respectively. Matrix 30 includes appropriate circuitry for reconstituting an NTSC chroma signal which appears on output lead 31. The Y + sync output of block 21 is coupled by lead 26 to an adder circuit 32 where, in conjunction with the NTSC chroma signal from matrix 30, a complete NTSC television signal is formed for application to a color television receiver.

The system of FIG. 1 constitutes a broad disclosure of the aspect of the invention dealing with the method of encoding and decoding the color-difference signals and is included to show that the luminance and synchronizing information (as well as sound information, if desired) may be processed separately from the color information. The details and benefits of the invention will be explained in connection with FIGS. 2 and 4 which represent the preferred embodiment of the system wherein a low frequency portion of the luminance signal is line sequentially encoded with the color-difference signals. It will be shown that practice of the method of the invention eliminates the need for line identification and close phase-synchronization between the encoding and decoding apparatus and results in a very attractive simplification of these structures.

Figure 2:
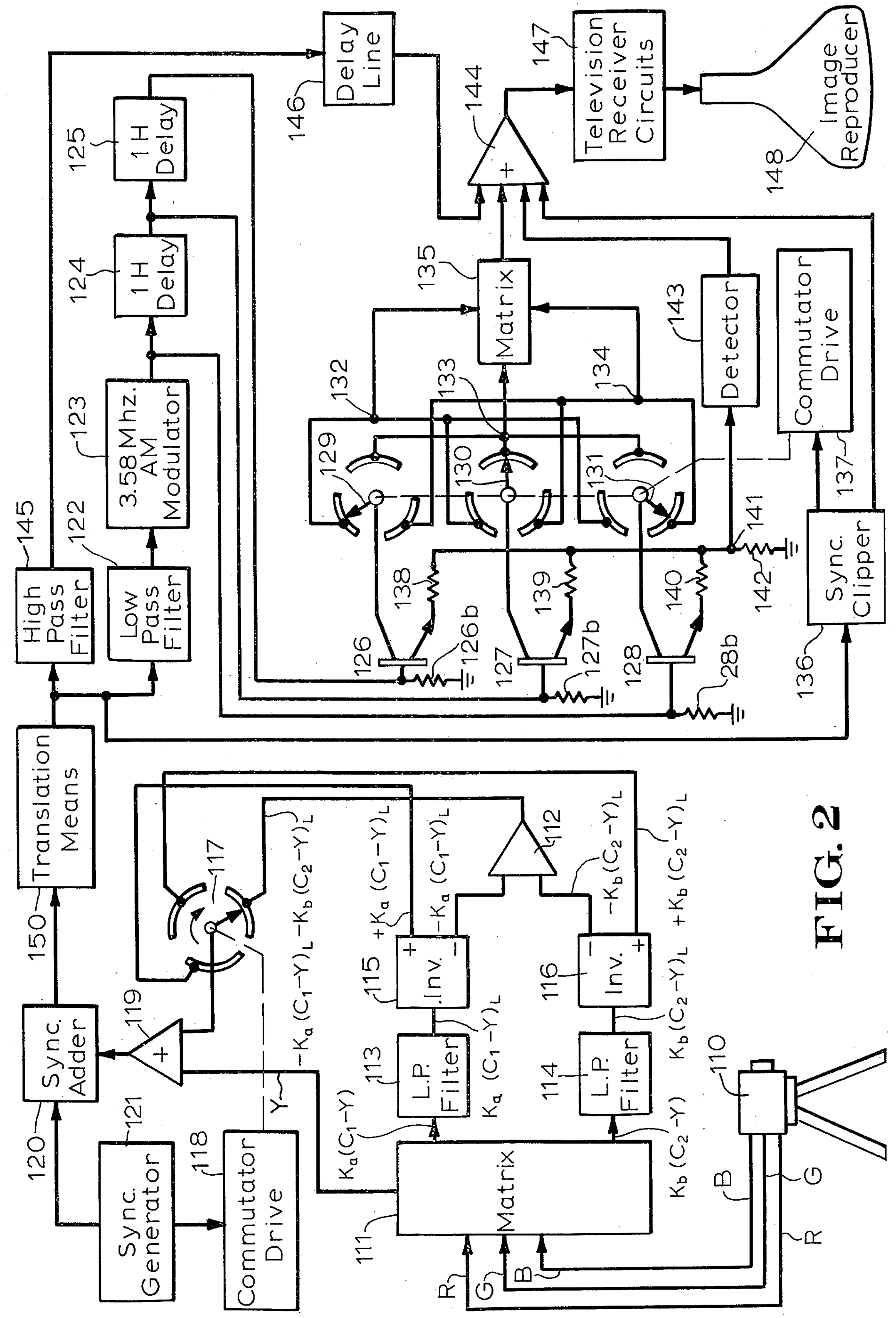
FIG. 2 is a block diagram, partially in schematic form, of a specific practical embodiment of a color television encoding and decoding system constructed in accordance with the invention.

Referring to the more specific disclosure of FIG. 2, a camera 110 generates three conventional primary color signals, R, G and B, conveying luminance and chrominance information in the televised scene. These signals are applied to a matrix circuit 111, wherein they are selectively combined to develop the Y signal conveying brightness information, and two generalized color-difference signals, $K_a(C_1-Y)$ and $K_b(C_2-Y)$, conveying chrominance information. In these expressions $K_a$ and $K_b$ are constants and $(C_1-Y)$, $(C_2-Y)$ are different generalized color-difference components. The color-difference signals are applied to low pass filters 113 and 114, which are constructed to pass only video frequencies falling below approximately 600 KHz. These filters may comprise any one of a number of well-known multisection types with appropriate impedance elements of values to achieve the desired 600 KHz frequency characteristics.

The $K_a(C_1-Y)_L$ and $K_b(C_2-Y)_L$ outputs from filters 113 and 114 (the subscript L denoting a low frequency component) are applied to respective ones of two phase inverters 115 and 116 wherein the signals are inverted such that $+K_a(C_1-Y)_L$ and $-K_a(C_1-Y)_L$ are available at the respective outputs of inverter 115. Similarly $+K_b(C_2-Y)_L$ and $-K_b(C_2-Y)_L$ are available at the outputs of inverter 116.

The third low frequency color-difference signal is formed in signal combiner 112 from the negatives of the $K_a(C_1-Y)_L$ and $K_b(C_2-Y)_L$ signals. These signals are applied to a commutator 117, which is schematically depicted as a three-segment mechanical switch with a rotating arm. In practice, this commutator comprises an electronic switch consisting of three active switch devices or their equivalents with appropriate control circuits for achieving, from an applied drive signal, the desired 120° segmented switching action.

Commutator 117 is driven by a commutator drive circuit 118, which may comprise an appropriate number of frequency divider circuits for obtaining a desired commutator switching rate from the horizontal sync pulses. In practice the commutator is driven so that it cycles at one third the horizontal scanning rate and the $K_a(C_1-Y)_L$, $K_b(C_2-Y)_L$ and $-K_a(C_1-Y)_L$ $-K_b(C_2-Y)_L$ components are sampled every third horizontal line. The resulting line sequential signals thus are of the form $K_a(C_1-Y)_L$, $K_b(C_2-Y)_L$ and $-K_a(C_1-Y)_L$ $-K_b(C_2-Y)_L$ for each of the 175 groups of three lines contained in the 525 line NTSC format. This signal is applied to additive video amplifier 119 wherein it is combined with the full frequency luminance signal Y developed in matrix 111. This produces line sequential signals of the general form $S_a$, $S_b$ and $S_c$, where:

$$S_a=Y+K_a(C_1-Y)_L$$
$$S_b=Y+K_b(C_2-Y)_L$$
$$S_c=Y-K_a(C_1-Y)_L-K_b(C_2-Y)_L$$

Since any generalized color-difference signal may be expressed as a combination of primary color-difference signals, particularly R−Y and B−Y, it also follows that, $$S_a=Y+K_1(R-Y)+K_2(B-Y)$$
$$S_b=Y+K_3(R-Y)+K_4(B-Y)$$
$$S_c=Y+K_5(R-Y)+K_6(B-Y)$$

In accordance with the above-mentioned related application of Howard F. Jirka, the line sequential signals are weighted so that $S_a+S_b+S_c=3Y$. Therefore, the system parameters are so proportioned that $$K_1+K_3+K_5=0 \text{ and } K_2+K_4+K_6=0.$$

Thus, $$K_5=-(K_1+K_3),$$
$$K_6=-(K_2+K_4)$$

and the third line sequential signal is:

$$S_c=Y-(K_1+K_3)(R-Y)-(K_2+K_4)(B-Y)$$

These signals are applied to a sync adder stage 120 wherein horizontal and vertical synchronizing pulses from a conventional sync generator 121 are added to form the final video signal. The sync generator also supplied synchronization to the camera by means (not shown) and supplies horizontal sync pulses as a reference signal to commutator drive 118 to assure line-synchronized operation of that device.

Once the sync pulses have been added the signal can be translated through a narrow bandwidth channel with minimal impairment of color fidelity since chrominance information now lies below 600 KHz, instead of at 3.58 Mhz as in a conventional NTSC composite video signal. The block 150, labeled TRANSLATION MEANS, may thus comprise any appropriate transmission or storage means as discussed with reference to translation means 20 of FIG. 1. With tape and video discs, it may also be desirable to frequency modulate a carrier with the line sequential television signals, and record the modulated carrier on the tape or disc to reduce signal pickup problems. Equipment for frequency modulating the television signal on a carrier is not shown in the present embodiment since methods and circuitry therefor are well known.

Once the line sequential television signal has passed through translation means 150, it is processed to convert it back to a format suitable for direct application to a television receiver. While the standard receiver is assumed herein to be one compatible with an NTSC type color signal, such need not be the case since the sequential signal may be subsequently encoded for use with any specific type color receiver. The following description is, however, addressed to receivers useful with NTSC type signals.

The low frequency portions of the line sequential color signals are translated through a low pass filter 122 which, like its counterparts 113 and 114 in the encoder, allows only video signals falling below 600 KHz to pass. These low frequency signals are applied to a 3.58 MHz oscillator and AM modulator 123, wherein a locally generated 3.58 MHz carrier is amplitude modulated by the color signals in a conventional balanced modulator circuit. The resulting modulated 3.58 MHz signals are applied to a series-connected pair of high frequency delay lines 124 and 125. These delay lines each introduce a one horizontal line or 63.5 microsecond delay to the 3.58 MHz signals to make one of each of the line sequential signals simultaneously available for matrixing into the color portion of an NTSC composite video signal in a manner which will be presently explained.

The undelayed output from modulator 123 is applied directly to a first chrominance amplifier 128, which preferably comprises a conventional NPN transistor having collector and emitter output circuits for providing two outputs of opposite phase. Similarly, the one-line-delayed signal from delay line 124 is applied to a second chrominance amplifier 127, and the two-line-delayed line sequential signal from delay line 125 is applied to a third chrominance amplifier 126.

The inverted outputs of amplifiers 126–128 are applied to the arms of respective ones of three ganged commutator switches 129–131. To understand the operation of these switches it is necessary to first consider the functioning of delay lines 124 and 125, which have the effect of making each of the sequentially transmitter 3.58 MHz color signals simultaneously available within the receiver.

Assuming coding in the form $S_a$, $S_b$ and $S_c$, and using numerical subscripts to identify the scan line, at the beginning of line 10, $S_{10}$ will appear in the output of modulator 123, $S_9$ in the output of delay line 124 and $S_8$ in the output of delay line 125. One line later, $S_{11}$ will be in the output of modulator 123, $S_{10}$ in the output of delay line 124 and $S_9$ in the output of delay line 125. One line later, the arrangement will be $S_{12}$, $S_{11}$ and $S_{10}$, respectively. At the beginning of line 40 the sequence will be $S_{40}$, $S_{39}$, $S_{38}$; and at the beginning of line 50 it will be $S_{50}$, $S_{49}$, $S_{48}$. Thus, at any instant, three color-difference signals are available, but not at the same respective locations. Commutator switches 129–131 route the outputs of amplifiers 126–128 to appropriate ones of terminals 132–134, so that each terminal is associated with a single color-difference signal. If primary color-difference signals are used in the encoding process, for example, a useful sequence might be:

$S_a=Y+K_a(R-Y)_L$ $S_b=Y+K_b(B-Y)_L$ and $S_c=Y-K_a(R-Y)_L-K_b(B-Y)_L$

It should be understood that in a typical sequencing system $S_a$ would appear on lines 1, 4, 7, 10, etc.; $S_b$ on lines 2, 5, 8, 11, etc.; and $S_c$ on lines 3, 6, 9, 12, etc. In this situation, commutator switch 129 is phased to connect the output of amplifier 126 to terminal 132 during occurrence of green color-difference signals, to terminal 133 during occurrence of red color-difference signals, and to terminal 134 during occurrence of blue color-difference signals. Similarly, commutator switches 130 and 131 direct the output signals from amplifiers 127 and 128 to terminals 132–134, respectively, so that color-difference signals of the proper species are always present thereon.

To be effective, commutator switches 129–131 operate in synchronism with their counterpart commutator switch 117 in the transmitter or encoder. To this end, a sync clipper circuit 136 is provided to derive horizontal and vertical synchronizing pulses from the received signal. These sync pulses are applied to a commutator drive 137 wherein they are divided down and utilized in synchronizing the switching action of the three commutator switches. Again, it must be emphasized that the commutator switches are shown as mechanical rotary switches for descriptive purposes only; in practice conventional all-electronic switching circuitry would be used.

A system of line identification is also required to insure that commutator switches 129–131 always place the proper line sequential signals on the appropriate terminals. To this end, the sequence in the encoder and decoder is made the same, and each frame scan begins with the same generalized color-difference signal. This simplification allows the vertical sync pulses to control the "start" of the commutator switches and the horizontal sync pulses to control the stepping of the commutator switches.

One useful set of sequential signals is $$S_a = Y + \frac{30}{59}(R-Y)$$

$$S_b = Y + \frac{11}{59}(B-Y)$$

$$S_c = Y - \frac{30}{59}(R-Y) - \frac{11}{59}(B-Y) = Y + (G-Y)$$

Here the G—Y signal is formed during the encoding process. However, as will be seen, when converting the signal to an NTSC subcarrier type, amplitudes must be changed and line identification is still required.

In accordance with this invention the encoding parameters are selected to render it unnecessary to include amplitude correction or line identification circuitry and yields a system with what shall be termed phase and amplitude-balanced color-difference signals.

Figure 3:
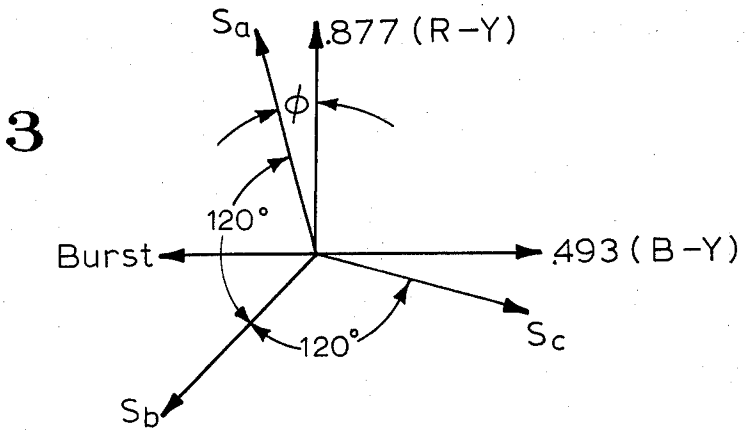
FIG. 3 is a diagram showing the relationship between the R–Y and B–Y axis and three symmetrical axes $S_a$, $S_b$ and $S_c$ corresponding to the line sequential signals.

Referring now to FIG. 3, there are shown conventional R—Y and B—Y color signal axes and three symmetrical axes, mutually displaced by 120°, labeled $S_a$, $S_b$ and $S_c$ with $S_a$ being displaced from R—Y by an angle $\phi$. The color reference burst is also shown and extends in the −(B—Y) direction. The following mathematical analysis derives the encoding parameters for symmetrically encoding $S_a$, $S_b$ and $S_c$ signals from a general chrominance signal, which may be expressed in terms of R—Y and B—Y, based upon its projections on the $S_a$, $S_b$ and $S_c$ axes.

By observation:

$S_a=0.877\cos\phi(R-Y)-0.493\sin\phi(B-Y)$;

$S_b=0.877\cos(120°+\phi)(R-Y)-0.493\sin(120°+\phi)(B-Y)$; and $S_c=0.877\cos(240°+\phi)(R-Y)-0.493\sin(240°+\phi)(B-Y)$.

To simplify, let $K_1=0.877\cos\phi$, $K_2=-0.493\sin\phi$, $K_3=0.877\cos(120°+\phi)$, and $K_4=-0.493\sin(120°+\phi)$.

Then:

$S_a=K_1(R-Y)+K_2(B-Y)$, $S_b=K_3(R-Y)+K_4(B-Y)$, and $S_c=-(K_1+K_3)(R-Y)-(K_2+K_4)(B-Y)$, which is the generalized form for encoding the three line sequential signals in accordance with the invention.

A set of very useful sequential signals may be obtained by setting $\phi=0$. Therefore, $K_1=0.877$ $K_2=0$ $K_3=-0.438$ $K_4=-0.427$ The three line sequential signals become:

$S_a = 0.877(R-Y)$, $S_b = -0.438(R-Y) - 0.427(B-Y)$, and $S_c = -0.438(R-Y) + 0.427(B-Y)$.

Encoding in this form produces a set of phase and amplitude-balanced color-difference signals and eliminates the need for amplitude correction or line identification at the decoder. This technique greatly simplifies the system and also is insensitive to phasing differences between the encoder and decoder.

Addition of the luminance signal Y to these signals yields $S_a = Y + 0.877(R-Y)$ $S_b = Y - 0.438(R-Y) - 0.427(B-Y)$ $S_c = Y - 0.438(R-Y) + 0.427(B-Y)$.

This set of encoded signals enjoys the same attributes of not requiring line identification nor amplitude correction in the decoder.

All prior art systems using line sequential encoding included means for line identification. In some such systems the sense of the demodulated burst signal was determined and used for identifying the various color-difference signals, which required different processing in the decoder; that is, the different color-difference signals received unequal amplification and were subjected to different degrees of phase shifting for reconstitution into an NTSC type signal. An important aspect of the system of the invention is that it allows all of the signals to be processed identically both as to amplification and phase shifting. It is also not necessary that the operation of the decoding switch be in phase with the operation of the encoding switch, it only being required that both switches have the same sequence of color signals. If the decoding switch lags (or leads) the encoding switch, the effect is that of a rotation of all of the vectors of FIG. 3 about the origin—the relative positions of the vectors, including burst, do not change (nor do the amplitudes) and the television receiver circuitry will process the signals without difficulty.

Returning to FIG. 2, the non-inverted outputs of amplifiers 126–128 are connected to a first matrix means comprising individual equal matrix resistors 138–140 and a common terminal 141, which is connected by a resistor 142 to ground. Equal amounts of the three low-frequency color-difference signals may be combined to derive the low-frequency luminance signal. This is accomplished by resistors 138–140, and the low-frequency luminance signal $Y_L$ is developed across resistor 142.

The low-frequency luminance signal developed on a 3.58 MHz carrier across common emitter resistor 142 is subtracted from the inverted signals developed in the collector output circuits of transistors 126–128. This has the effect of eliminating the $Y_L$ components therefrom so that just the color-difference portions of the signals (amplitude-modulated on a 3.58 MHz carrier) are applied to commutator switches 129–131 and appear at terminals 132–134. These signals are applied to matrix means 135 wherein they are appropriately combined with predetermined relative phases and amplitudes to produce a standard NTSC chrominance signal of the format $0.877(R-Y)\cos\omega t + 0.493(B-Y)\sin\omega t$. As will be seen below, with the line sequential signals encoded in accordance with the preferred embodiment of the invention, matrix 135 need include only appropriate symmetrical phase shifting circuits for two of the color-difference signals and no level changing arrangements.

The $Y_L$ signal consists of an amplitude-modulated 3.58 MHz carrier, and must be demodulated by a detector 143, which may be a conventional envelope detector or its equivalent, prior to recombination with the color-difference signals in matrix amplifier 144.

The high frequency luminance signal component $Y_H$ which was transmitted non-sequentially, i.e., unswitched, is recovered with a high-pass filter 145, passed through a delay line 146 and applied to an input of matrix amplifier 144. The high-pass filter prevents the low-frequency line sequential signals from being coupled through this path, which would negate the recombination accomplished by commutator switches 129–131, matrix means 135 and matrix amplifier 144. Delay line 146 compensates for the slightly increased propagation time of signals through the narrower bandwidth channel including low-pass filter 122 and delay lines 124 and 125. Horizontal and vertical synchronizing pulses are also added in matrix amplifier 144. Appropriate clamping and DC restoration circuits may be incorporated at this point to condition the signal for optimum reproduction.

The output of matrix amplifier 144 is an NTSC composite video signal and is applied to television receiver circuits 147, which may be those in any conventional television receiver. Therein the composite signal is amplified and demodulated to obtain suitable video signals for driving an image reproducer 148. While a video frequency signal is shown as being applied to receiver 147, in appropriate situations the output of matrix amplifier 144 may be used to modulate an RF signal which could then be directly applied to the antenna input terminals of the receiver as a regular airborne broadcast signal.

Figure 4:
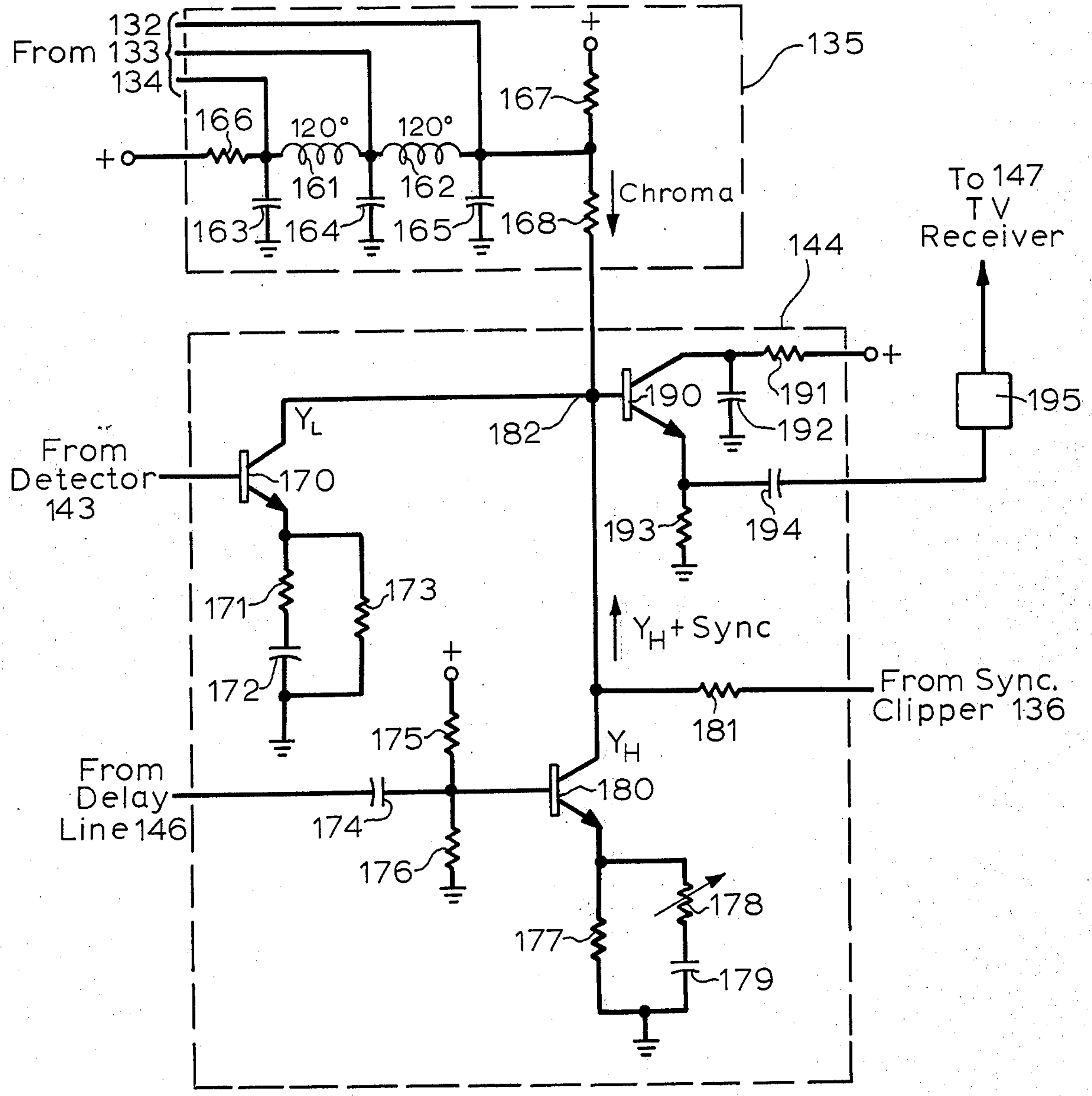
FIG. 4 is a schematic diagram of the simplified matrix arrangement of a decoder for the system shown in FIG. 2.

FIG. 4 is a detailed schematic diagram showing of matrix 135 and matrix amplifier 144 of FIG. 2. Matrix 135 is indicated by the dashed line box and comprises a pair of 120° phase shifting networks including inductances 161 and 162 as the series arms and capacitors 163, 164 and 165 as the shunt arms. Resistors 166 and 167 are parallel connected DC biasing resistors (in conjunction with base resistors **126*b*, 127*b* and 128*b*) for the transistors comprising chrominance amplifiers 126, 127 and 128 shown in FIG. 2. Resistors 166 and 167 are in parallel for DC since the DC resistances of inductances 161 and 162 are negligible. The DC path for amplifier 126 extends from B+, through resistor 167, terminal 132, and via commutator switches 129–131 to the collector of amplifier 126. The parallel path through resistor 166 and inductances 161 and 162 should also be noted. Similarly, a DC bias path extends from B+, through resistor 166, and terminal 134 to the collector of amplifier 128 (note the parallel path through resistor 167 and inductances 161 and 162). The collector of amplifier 127 is supplied DC over lead 133, which connects to the middle of the phase shifting network. Here it is clear that resistors 166 and 167 both contribute current through low resistance inductances 161 and 162. Resistors 166 and 167 also terminate the phase shifting network to avoid reflections. Thus signals corresponding respectively to the three original color-difference signals appear on terminals 132, 133 and 134, are connected to the input terminals of the phase shifting network, and receive appropriate phase shifting. For example, the signal appearing on terminal 134** experiences a 240° phase shift, that on terminal 133 experiences a 120° phase shift and that on terminal 132 experiences no phase shift.

It will be recalled that the color-difference signals were originally encoded as three line sequential signals of the form $S_a=0.877(R-Y)$ $S_b=-0.438(R-Y)-0.427(B-Y)$ $S_c=-0.438(R-Y)+0.427(B-Y)$ The signals $S_{a'}$, $S_{b'}$ and $S_{c'}$ appearing on leads 132, 133 and 134 are identical to $S_a$, $S_b$ and $S_c$ except for the sine and cosine terms which result from the signals being modulated on the 3.58 MHz carrier.

Thus:

$S_{a'} =0.877(R-Y)\cos\omega t$ $S_{b'} =[-0.438(R-Y)-0.427(B-Y)]\cos(\omega t+120°)$ $S_{c'} =[-0.438(R-Y)+0.427(B-Y)]\cos(\omega t+240°)$ where the primes are used to indicate the effects of modulation.

Combining the terms yields:

$$S_{a'}+S_{b'}+S_{c'}=(R-Y)\ [0.877\cos\omega t-0.438\cos(\omega t+120°)-0.438\cos(\omega t+240°)]+(B-Y)\ [-0.427\cos(\omega t+120°)+0.427\cos(\omega t+240°)].$$

Expanding and grouping the terms, $$=(R-Y)\ [(0.877-0.438\cos120°-0.438\cos240°)\cos\omega t+(0.438\sin120°+0.438\sin240°)\sin\omega t]+(B-Y)\ [(-0.427\cos120°+0.427\cos240°)\cos\omega t+(0.427\sin120°-0.427\sin240°)\sin\omega t].$$

Combining again:

$$=(R-Y)\ [(0.877+0.438\cos60°+0.438\cos60°\cos\omega t+(0.438\sin60°-0.438\sin60°)\sin\omega t]+(B-Y)\ [(0.427\cos60°-0.427\cos60°)\cos\omega t+(0.427\sin60°+0.427\sin60°)\sin\omega t]$$

yields:

$$=1.5(R-Y)0.877\cos\omega t+1.5(B-Y)0.493\sin\omega t$$

which is the original color signal expressed in R—Y and B—Y form multiplied by a constant factor of 1.5. Thus, it will be seen that the encoding system achieves the results claimed for it.

Resistor 168 (also resistors 166 and 167) is in the DC path for the luminance amplifiers $Y_L$ and $Y_H$. The DC path is traceable from B+, through resistor 166 (and the parallel path through resistor 167 and the low resistance inductances 161 and 162), through resistor 168 to junction point 182, which is on the collector electrodes of luminance amplifier transistors 170 and 180. Accordingly, a reconstituted set of NTSC color-difference signals is presented to terminal 182 of matrix amplifier 144.

It will be particularly noted that the incoming signal levels have not been altered. Selection of the encoding parameters based upon projections of an equivalent NTSC color signal on three mutually displaced axes allows full reconstitution of the signals with an equal gain symmetrical phase delay circuit. As mentioned above, other than knowledge of the coding sequence, line identification is not required.

Matrix amplifier 144 indicated by the dashed line box includes a low frequency luminance ($Y_L$) amplifier transistor 170, a high frequency luminance ($Y_H$) amplifier transistor 180 and a composite signal amplifier transistor 190. The reconstituted low frequency luminance signal from detector 143 is coupled to the base of transistor 170. The emitter of transistor 170 is returned to ground through a bias and gain compensation network comprising a series connection of a resistor 171 and a capacitor 172, in parallel with a resistor 173. Its collector is connected to junction point 182 at the base input of composite signal amplifier transistor 190. The $Y_H$ signal is supplied from delay line 146 through a coupling capacitor 174 to the base of transistor 180. Bias for the base of transistor 180 is obtained by the combination of resistor 175 and resistor 176. The emitter of transistor 180 is returned to ground through an appropriate gain compensation and bias network comprising a series connection of a variable resistor 178 and capacitor 179, in parallel with a resistor 177. Variable resistor 178 is optional but affords versatility in tailoring the high frequency luminance gain. The collector of transistor 180 is connected to junction point 182. The remaining input of matrix amplifier 144 connects the output of sync clipper 136, through a resistor 181, to junction point 182.

The collector of composite signal amplifier transistor 190 is connected to B+ through a signal decoupling arrangement comprising resistor 191 and capacitor 192. Transistor 190 is operated as an emitter follower and the composite signal output which appears across load resistor 193 is coupled via capacitor 194 to a block 195. The signals from the $Y_L$ amplifier, the $Y_H$ amplifier, the sync clipper and matrix 135 are all combined in the emitter output of transistor 190.

While block 195 is not essential, it may advantageously contain appropriate circuitry for modulating a carrier wave with the composite signal output from transistor 190. Since the signal is in conventional NTSC form, modulation thereof on an appropriate carrier will enable connection of the decoder directly to the antenna input terminals of television receiver circuits 147.

Thus, an encoding method and apparatus system which provides color television signals in a narrow bandwidth channel with minimal degradation of picture resolution and color fidelity is disclosed. The system is simple and economical in that line identification is not required and phase and amplitude-balanced color-difference signals are produced which simplifies the apparatus and removes the necessity for close phase locking between encoder and decoder. The system also incorporates line sequential signals which permit the luminance signal to be derived from equal contributions thereof. Furthermore, it will be appreciated that while the invention has been shown in conjunction with an NTSC signal format, it may also be used with other systems such as PAL and SECAM by appropriately modifying the circuitry and system component configuration.

While particular embodiments of the invention have been shown and described, it will be obvious to those skilled in the art that changes and modifications may be made thereto without departing from the invention in its broader aspects and, therefore, the aim in the appended claims is to cover all such changes and modifications as fall within the true spirit and scope of the invention.

What is claimed is:

1. A system comprising a source of three primary color television signals said system comprising:

encoding means coupled to said source for composing a luminance signal Y representative of the brightness of a scene and three phase and amplitude balanced color-difference signals representative of the chromaticity of the scene, said color-difference signals being equivalent to a resolution of an NTSC signal onto three equally spaced axes;

switch means for changing said color-difference signals into three line sequential signals of the form $S_a=Y+0.877\cos\phi(R-Y)-0.493\sin\phi(B-Y)$, $S_b=Y+0.877\cos(120°+\phi)\ (R-Y)-0.493\sin(120°+\phi)\ (B-Y)$, $S_c=Y+0.877\cos(240°+\phi)\ (R-Y)-0.493\sin(240°+\phi)\ (B-Y)$, where $\phi$ represents the angle between one of said line sequential signals and the R—Y axis; and means responsive to the output of said switch means for converting the line sequential encoded signals into color-difference signals of a type suitable for application to a color television receiver.

2. A system as set forth in claim 1 where $\phi=0$.

3. A method of forming a video color signal having a plurality of color-difference signals derived from a plurality of primary color signals each representative of a different color characteristic of a scene and a luminance signal derived from selected portions of said primary color signals, which method comprises encoding said color-difference signals into three line sequential signals each being composed of said luminance signal and one of said color difference signals, each of said color difference signals having the same proportions as would be obtained from three projections of an equivalent NTSC or other chrominance signal upon three axes mutually separated by 120°.

4. The method as set forth in claim 3 wherein one of said three axes is selected to coincide with a primary color-difference signal axis.

5. The method as set forth in claim 4 wherein said one axis is the R—Y primary color-difference axis and wherein said color difference signals are $0.877(R-Y)$ $-0.438(R-Y)-0.427(B-Y)$ $-0.438(R-Y)+0.427(B-Y)$.

6. A system comprising a source of encoded color television signals having a luminance signal Y representative of the brightness of a scene and three phase and amplitude balanced color-difference signals representative of the chromaticity of the scene, said color-difference signals being equivalent to a resolution of an NTSC signal onto three equally spaced axes and being encoded in three line sequential signals of the form $S_a=Y+0.877\cos\phi(R-Y)-0.493\sin\phi(B-Y)$, $S_b=Y+0.877\cos(120°+\phi)\ (R-Y)-0.493\sin(120°+\phi)\ (B-Y)$, $S_c=Y+0.877\cos(240°+\phi)\ (R-Y)-0.493\sin(240°+\phi)\ (B-Y)$, where $\phi$ represents the angle between one of said line sequential signals and the R—Y axis, said system comprising:

means coupled to said source for deriving three colordifference signals free of luminance signal components;

decoding switch means coupled to said deriving means for converting said luminance free line-sequential color-difference signals into three simultaneous color-difference signals; and matrix means, including phase shifting means, coupled to said switch means for combining said three simultaneous color-difference signals in predetermined relative phases and amplitudes to produce a standard NTSC chrominance signal suitable for application to a color television receiver.

7. A system as set forth in claim 6 where $\phi=0$.

8. A method of forming a video color signal having a plurality of color-difference signals derived from a plurality of primary color signals each representative of a different color characteristic of a scene and a luminance signal derived from selected portions of said primary color signals, which method comprises:

matrixing said primary color signals to develop a luminance signal and three phase and amplitude balanced color-difference signals such that each of said color-difference signals is composed with the same proportions as would be obtained from three projections of an equivalent NTSC or other chrominance signal upon three axes mutually separated by 120°; and encoding said color-difference signals into three line sequential signals each consisting of the sum of said luminance signal and one of said color-difference signals, said sequential signals being constituted such that when equal parts thereof are added only said luminance signal remains.

9. The method as set forth in claim 8 wherein one of said three axes is selected to coincide with a primary color-difference signal axis.

10. The method as set forth in claim 9 wherein said one axis is the R—Y primary color-difference axis and wherein said sequential signals are $Y+0.877(R-Y)$ $Y-0.438(R-Y)-0.427(B-Y)$ $Y-0.438(R-Y)+0.427(B-Y)$.

11. A system for encoding and decoding color television signals in the form of color-difference signals primarily representative of the chromaticity of a scene, and a luminance signal representative of the brightness of the scene comprising: means cyclically combining said color-difference signals with said luminance signal to form line sequential encoded signals, the color-difference signals of said line sequential encoded signals being encoded with the same proportions and composition as would be obtained from projections of an equivalent NTSC or other chrominance signal upon three axes mutually separated by 120° and bearing a relationship such that when algebraically added in equal proportions only said luminance signal remains; translation means; means applying said line sequential encoded signals to said translation means; delay means coupled to said translation means rendering said line sequential encoded signals simultaneously available; and matrixing means combining equal portions of said simultaneously available line sequential encoded signals to derive said luminance signal.

12. The system of claim 11 wherein one of said three axes is selected to coincide with a primary color-difference signal axis.

13. The system of claim 12 wherein said primary colordifference signal axis is the R—Y axis.

14. In a decoder for processing color signals encoded through a switch means as a plurality of line sequential signals each including a luminance signal and a phase and amplitude balanced color-difference signal, said color-difference signals being equivalent to a resolution of an NTSC signal onto three equally spaced axes; decoding switch means, including delay means for rendering said line sequential signals simultaneously available;

synchronizing means for maintaining said decoding switch means in the same operating sequence as that of said encoding switch means and matrix means for combining said simultaneously available signals with equal gains and at equally displaced phase angles to produce a standard NTSC chrominance signal suitable for application to a color television receiver.

15. A decoder as set forth in claim 14 including high pass filter means in parallel with said decoding switch means and said matrix means; and means adding the output of said matrix means to the output of said filter means.

16. A decoder as set forth in claim 15 including modulation means for producing a carrier modulated with said encoded color signals for application to said decoding switch means; and detector means coupled to said decoding switch means for recovering said luminance signal.

* * * * *